US008174445B2

(12) United States Patent
Sollenberger et al.

(10) Patent No.: US 8,174,445 B2
(45) Date of Patent: *May 8, 2012

(54) METHOD AND APPARATUS FOR ENHANCED 911 LOCATION USING POWER CONTROL IN A WIRELESS SYSTEM

(75) Inventors: Nelson Ray Sollenberger, Farmingdale, NJ (US); Jack Harriman Winters, Middletown, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 970 days.

This patent is subject to a terminal disclaimer.

(21) Appl. No.: 11/293,412

(22) Filed: Dec. 2, 2005

(65) Prior Publication Data

US 2006/0084447 A1 Apr. 20, 2006

Related U.S. Application Data

(60) Division of application No. 10/456,052, filed on Jun. 6, 2003, now Pat. No. 6,972,717, which is a continuation of application No. 10/155,380, filed on May 24, 2002, now Pat. No. 6,590,533, which is a continuation of application No. 09/489,477, filed on Jan. 21, 2000, now Pat. No. 6,404,388.

(51) Int. Cl.
*G01S 1/24* (2006.01)

(52) U.S. Cl. ......................................... 342/387; 342/457

(58) Field of Classification Search .................. 342/386, 342/387, 419, 450, 457
See application file for complete search history.

(56) References Cited

U.S. PATENT DOCUMENTS

| | | | |
|---|---|---|---|
| 4,818,998 A | 4/1989 | Apsell et al. | |
| 4,891,650 A | 1/1990 | Sheffer | |
| 5,054,052 A * | 10/1991 | Nonami | 455/574 |
| 5,055,851 A | 10/1991 | Sheffer | |
| 5,208,756 A | 5/1993 | Song | |
| 5,218,367 A | 6/1993 | Sheffer et al. | |
| 5,461,365 A | 10/1995 | Schlager et al. | |
| 5,493,694 A | 2/1996 | Vlcek et al. | |
| 5,508,708 A | 4/1996 | Ghosh et al. | |
| 5,650,770 A | 7/1997 | Schlager et al. | |
| 5,732,354 A | 3/1998 | MacDonald | |
| 5,736,964 A | 4/1998 | Ghosh et al. | |
| 5,742,666 A | 4/1998 | Alpert | |
| 5,764,188 A | 6/1998 | Ghosh et al. | |
| 5,767,788 A | 6/1998 | Ness | |
| 5,890,077 A | 3/1999 | Hanawa et al. | |
| 5,893,036 A | 4/1999 | Trandai et al. | |
| 5,898,908 A | 4/1999 | Griffin et al. | |
| 5,926,133 A | 7/1999 | Green | |
| 5,973,643 A | 10/1999 | Hawkes et al. | |

(Continued)

OTHER PUBLICATIONS

Reed et al., "An Overview of the Challenges and Progress in Meeting the E-911 Requirement for Location Service," IEEE Communications magazine, Apr. 1998, pp. 30-37.

(Continued)

*Primary Examiner* — Dao Phan
(74) *Attorney, Agent, or Firm* — Woodcock Washburn LLP

(57) ABSTRACT

Methods of selecting a transmitter power for a mobile telephone include receiving a telephone number and transmitting a control message associated with selection of a transmitter power if the telephone number meets a predetermined criterion. For example, if the telephone number is an emergency service number or number associated with a navigation assistance service, the control message is transmitted.

20 Claims, 8 Drawing Sheets

U.S. PATENT DOCUMENTS

| | | |
|---|---|---|
| 6,172,644 B1 | 1/2001 | Stilp |
| 6,184,829 B1 | 2/2001 | Stilp |
| 6,334,059 B1 | 12/2001 | Stilp et al. |
| 6,385,462 B1 * | 5/2002 | Baum et al. .................... 455/522 |
| 6,404,388 B1 | 6/2002 | Sollenberger et al. |
| 6,519,465 B2 * | 2/2003 | Stilp et al. .................. 455/456.1 |
| 6,590,533 B2 * | 7/2003 | Sollenberger et al. ......... 342/387 |
| 6,590,874 B1 | 7/2003 | Wang et al. |
| 6,625,455 B1 * | 9/2003 | Ariga ......................... 455/456.1 |
| 6,972,717 B2 * | 12/2005 | Sollenberger et al. ......... 342/387 |
| 7,158,490 B1 * | 1/2007 | Tran et al. ...................... 370/318 |
| 2007/0030156 A1 * | 2/2007 | Schlager et al. ............ 340/573.1 |

OTHER PUBLICATIONS

Klukas et al., "Field Tests of a Cellular Telephone Positioning System," 0-7803-3659-3/97; 1997 IEEE; pp. 470-474.

* cited by examiner

METHOD AND APPARATUS FOR ENHANCED 911 LOCATION USING POWER CONTROL IN A WIRELESS SYSTEM

CROSS REFERENCE TO RELATED APPLICATIONS

This application is a divisional of U.S. patent application Ser. No. 10/456,052, filed Jun. 6, 2003, now U.S. Pat. No. 6,972,717, which is a continuation of U.S. patent application Ser. No. 10/155,380, filed May 24, 2002, now U.S. Pat. No. 6,590,533, which is a continuation of U.S. patent application Ser. No. 09/489,477, filed Jan. 21, 2000, now U.S. Pat. No. 6,404,388, all of which are incorporated herein by reference.

FIELD OF THE INVENTION

The present invention relates generally to location and communication systems and, more particularly, to determining the location of a mobile telephone within a service area of the mobile telephone.

BACKGROUND OF THE INVENTION

Mobile telephone system operators provide telephone service to subscribers by providing a mobile communications infrastructure in a geographic region or by negotiating access for subscribers to other mobile telephone system operators. Each mobile telephone system generally includes a plurality of cell sites distributed over a geographic region. Each cell site includes a base station having a transmitter and receiver for communicating with mobile telephones within a coverage area or "cell" around the cell site. Cell sites are placed such that there is a continuous or nearly continuous coverage area over a geographic region. This allows mobile telephone users the freedom to use a telephone over a wide geographic area.

The freedom of movement afforded by mobile telephones is advantageous. However, during an emergency such as a 911 telephone call originated from a mobile telephone, locating the mobile telephone is difficult as compared with locating a land-line originated 911 telephone call. This is because land line 911 calls may be located and correlated with a street address based on the telephone number of the land-line telephone. By contrast, the telephone number of a mobile telephone does not help to locate the mobile telephone because mobile telephone calls can be originated from anywhere within the service area.

One reason for the popularity of mobile telephones is that they can be used for emergencies when outside of the home. For example, a motorist could use the mobile telephone to call for assistance in case of a disabled vehicle. Many areas provide a special emergency mobile telephone number. In other areas, users can dial 911, just as they would from a conventional land-line telephone.

One of the problems with using a mobile telephone for emergencies stems from its mobility. Public service providers, such as police, may not know the location of a mobile telephone calling the emergency number. In addition, users who call the emergency number often cannot provide enough location information to allow the public service provider to find them. Thus, it is desirable to provide a mobile telephone system which can determine the location of a mobile telephone that calls an emergency number and to provide location information to public service providers, for example the police. A mobile telephone location service would also be desirable for providing location information to telephone users who are lost within the service area and to fleet vehicle operations who benefit from accurately knowing the location of fleet vehicles.

In general there are two approaches for determining the location of a mobile telephone. The first is to implement location technology in the mobile telephone itself. For example, a global position system (GPS) device may be included in a mobile telephone for determining a precise location. This location may then be transmitted to the mobile telephone network for use in locating the mobile telephone user. However, this approach is expensive to implement, may tend to enlarge mobile telephones and may be ineffective indoors and wherever the GPS satellite signals are blocked from reception by the mobile telephone.

The second approach is to design the location technology into the mobile telephone network without substantially modifying the mobile telephone. Using this approach, the location of a mobile telephone is determined based on an analysis of an incoming signal at one or more base stations in a mobile telephone network. The accuracy of the location determination may be improved by the reception and analysis of the incident signal from the mobile telephone at more than one base station. Receipt at three base stations, for example, affords the ability to determine location based on triangulation.

Mobile telephones generally are programmed to adjust transmission power so that a single base station clearly receives signals from the mobile telephone and the remaining base stations in the network receive the signals at a sufficiently low power level to not interfere with other mobile telephone transmissions. This approach, taken to improve quality and/or frequency reuse within a geographic region, adversely impacts the ability of a mobile telephone network to determine the location of a mobile telephone.

There is a need for a new method for determining the location of a mobile telephone which does not require costly modifications of the mobile telephone and which permits the accurate determination of the location of a mobile telephone. There is a further need for the method to be flexibly invoked, including in response to an emergency telephone call. The method should also determine location accurately enough to comply with the E911 regulations adopted by the Federal Communications Commission (FCC) in 1996.

SUMMARY OF THE INVENTION

According to the present invention, the aforementioned problems are overcome by increasing the transmit power of a mobile telephone prior to location determination.

According to one embodiment of the invention, a method of locating a mobile telephone, includes steps of receiving, transmitting, increasing and determining. In the receiving step, a first base station receives a call from a mobile telephone, the call including a dialed number and a TDMA signal. In the transmitting step, the base station transmits a control message to the mobile telephone when the dialed number meets a predetermined criteria, such as being 911. The control message instructs the mobile telephone to transmit the TDMA signal at a maximum power. In the increasing step, the mobile telephone increases the TDMA signal to maximum power in response to the control message. Then in the determining step, location information for the mobile telephone is determined based on at least one characteristic of the TDMA signal received at the first base station and possibly at other base stations.

The characteristic of the TDMA signal may be the time of arrival of the TDMA signal. Alternatively, the characteristic of the TDMA signal may be the angle of arrival of the TDMA signal.

In an alternate embodiment of the invention, the method of locating the mobile telephone includes steps of receiving, invoking, transmitting and determining. In the receiving step, a first base station receives a signal from a mobile telephone. Then in the invoking step, a mobile telephone system invokes a location function in response to the signal. The location function may be invoked based on the identification of the mobile telephone and a user or service profile, invoked based on the dialed telephone number, automatically invoked upon each registration of the mobile telephone with the mobile telephone network or other convenient criteria. In the transmitting step, the base station transmits to the mobile telephone a control message instructing the mobile telephone to transmit a TDMA signal at an increased power level. In the receiving step, at least one base station receives the TDMA signal transmitted at the increased power level. Then in the determining step, a location of the mobile telephone is determined based on the TDMA signal received at one or more base stations.

BRIEF DESCRIPTION OF THE FIGURES

The above described features and advantages of the present invention will be more fully appreciated with references to the detailed description and appended figures, in which.

DETAILED DESCRIPTION

Figure 1:
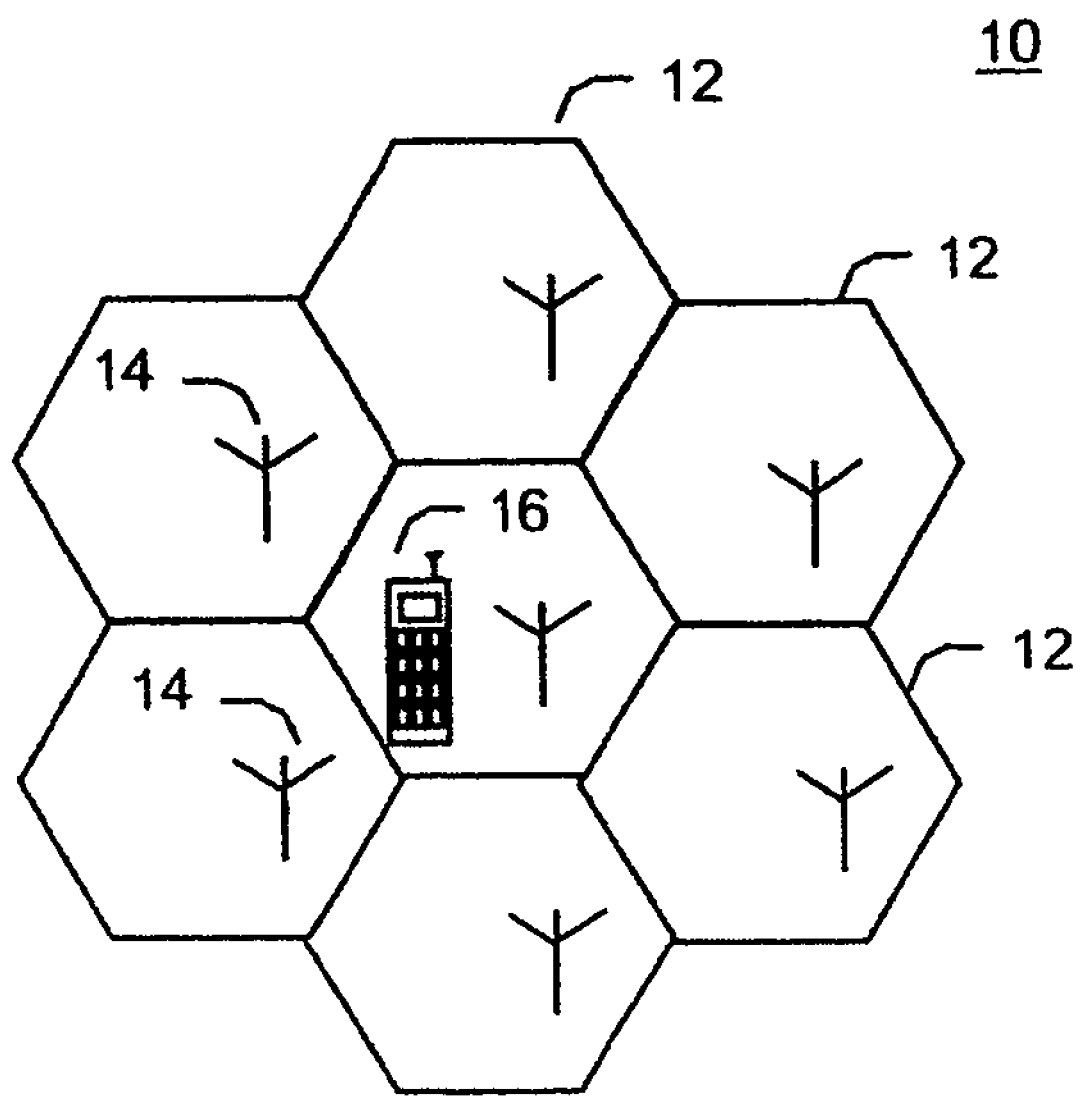
FIG. 1 depicts a geographic area divided into cells to illustrate the service area of a mobile telephone system.

FIG. 1 shows the geographic area 10 of a mobile telephone system. The serving area 10 is illustratively depicted as having hexagonal cells 12, where each hexagon represents the coverage area of a base station antenna 14. Each cell has assigned to it a plurality of voice or data channels (i.e., frequencies) for transmitting and receiving voice or data signals, and a control channel for transmitting and receiving control data signals. Referring to FIG. 1, consider mobile telephone 16 which is operating in the area of the mobile telephone system 10. The mobile telephone 16 communicates voice or data and control signals over the air with the mobile telephone system 10. Voice or data signals are communicated between the mobile telephone 16 and one of the antennas 14 over one of the cell's voice or data channels. Control data signals are communicated between mobile telephone 16 and the antenna 14 via the cell's control channel.

Referring to FIG. 1, the center cell 12 is most likely serving the mobile telephone 16. Therefore, the mobile telephone 16 communicates through the center cell. In addition to communicating voice or data with the serving cell 12, the mobile telephone 16 also monitors control channels of nearby cells 12. The mobile telephone 16, for example, in accordance with the IS-54 and IS-136 standards, measures the signal strengths of the control channels of nearby cells. These control channel signal strength measurements are sent to a mobile switching center ("MSC") 20 shown in FIG. 2. In addition, the mobile telephone 16 measures the signal strength of the voice or data signal it is receiving from the antenna 14 of the serving cell 12. The voice or data channel signal strength measurement is periodically sent by the mobile telephone 16 to the MSC 20 via the serving cell's reverse voice channel.

As the mobile telephone 16 travels within the geographic area of the mobile telephone system 10, the signal strength of the voice or data channel signal between the antenna 14 and the mobile telephone 16 will vary. As the mobile telephone 16 enters another cell, for example, the signal strength of the control channel signal from the antenna 14 of the newly entered cell will become stronger than the signal strength of the voice channel signal from antenna 14 of the center cell 12. At this point, it is desirable for the mobile telephone 16 to terminate communication over the voice or data channel with the center cell 12 and to initiate communication via a voice channel of the newly entered cell 12. This operation is called a hand-off, and is used to change the serving cell while the mobile telephone 16 is traveling within the geographic serving area of the serving mobile telephone system 10 so that the mobile telephone 16 maintains voice channel communication via the antenna 14 with the strongest signal. This hand-off operation is well known in the art of mobile telephone systems, and the details of the operation will not be discussed herein.

Figure 2:
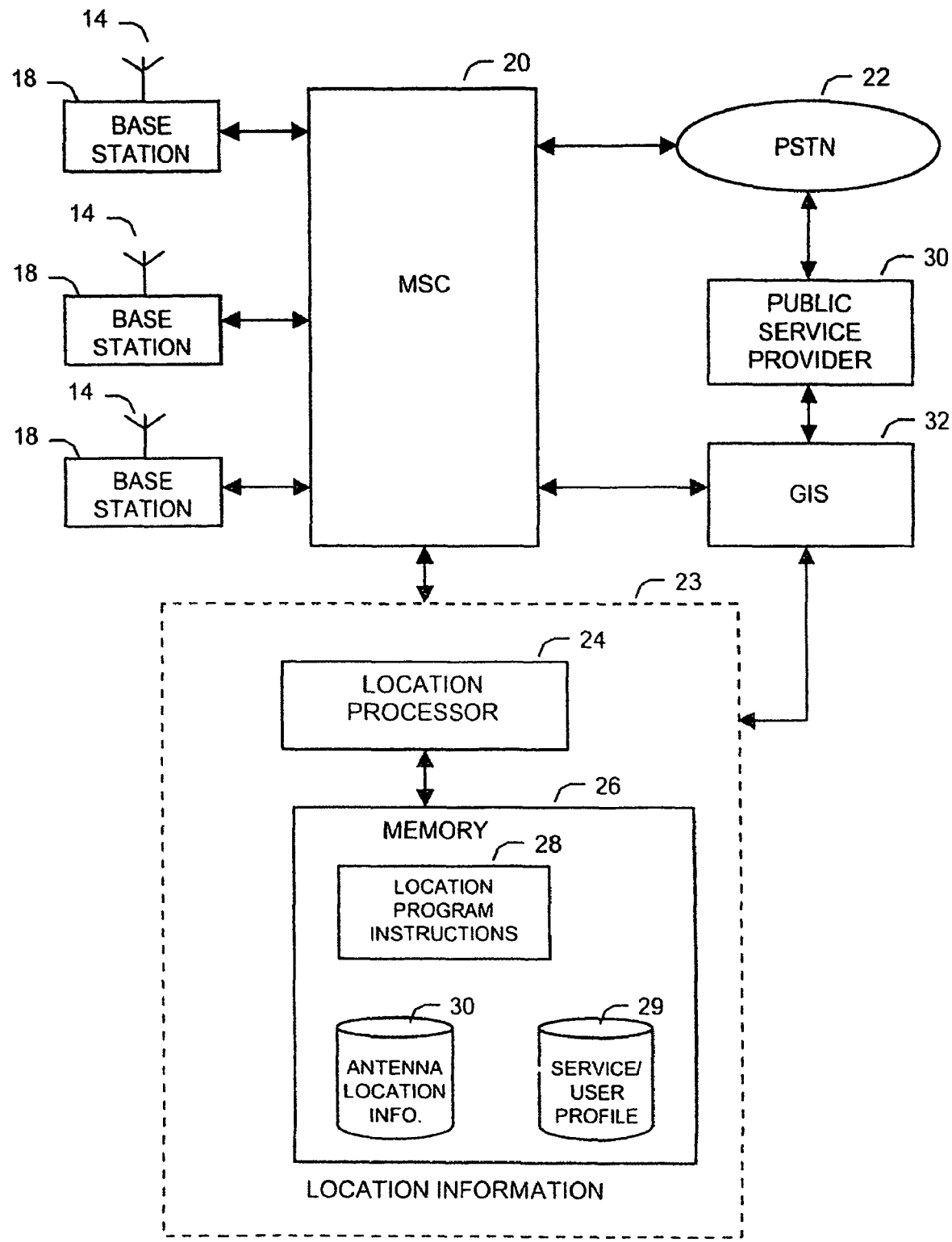
FIG. 2 depicts a view of features of the mobile telephone system, including a location processor according to an embodiment of the present invention.

FIG. 2 depicts components of a mobile telephone system 10 in accordance with one embodiment of the present invention. The mobile telephone system 10 includes the MSC 20, coupled to a plurality of base stations 18, each with an associated antenna 14. The MSC 20 is also disposed in communication with a public switched telephone network (PSTN) 22, a geographic information system ("GIS") 30, a location system 23. The location system 23 is described in further detail below.

Figure 7:
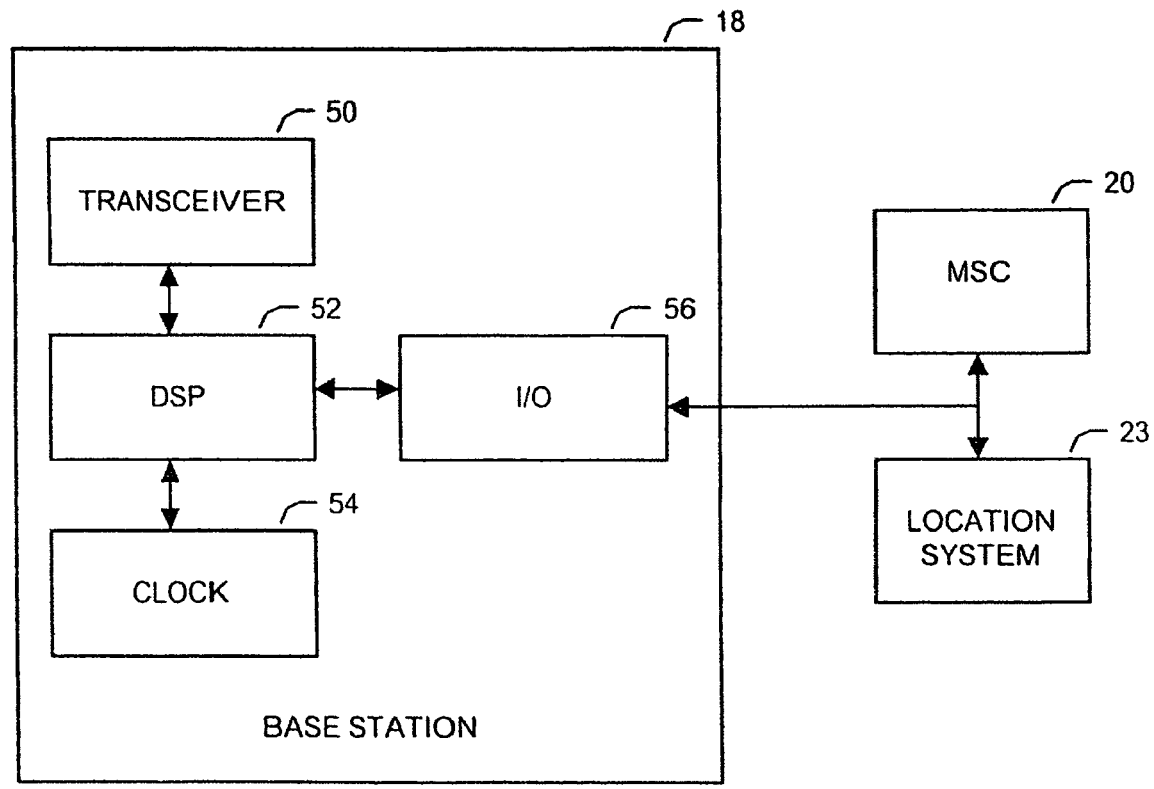
FIG. 7 depicts an internal view of a base station and its relationship with a mobile switching center and a location system according to an embodiment of the present invention.

Referring to FIG. 2, each base station 18 includes a transmitter and receiver coupled between the MSC 20 and its antenna 14. An internal view of a base station is depicted in FIG. 7. Referring to FIG. 7, the base station 18 includes a digital signal processor 52 coupled to a transceiver 50, a clock 54 and an input/output unit 56 for communicating with the MSC 20 and the location system 23. The transceiver 50 transmits signals to and receives signals from the mobile telephone 16. The digital signal processor 52 performs signals processing operations on voice and data signals conveyed between the transceiver and the input/output unit 56. The signal processing operations may include fast Fourier transforms, frequency domain or time domain convolution, as well as correlation functions which are useful in time of arrival calculations of TDMA signals.

The clock 54 may be implemented in a variety of ways. In general, the clock 54 at each base station 18 is synchronized with the clock 54 of other base stations. In TDMA systems, the clock 54 is also synchronized with a clock at each mobile telephone 16 that is registered or exchanging voice, data, or control signals with the base station 18. An example of a technique for maintaining clock synchronization among base stations is to implement a GPS receiver as part of the clock 54 at each base station 18. In this scenario, the GPS receiver receives clock signals from GPS satellites. Based on the clock signals received and the known location of the GPS receiving antenna, each base station may accurately determine the time. Moreover, as multiple base stations 18 each calculate time simultaneously based on received GPS signals, the clocks 54 of a plurality of base stations 18 are closely synchronized.

The DSP 52 may receive the time from the clock 54 and associate a time value with signals as they are received. The input/output unit 56 communicates data to and from the MSC 20 and the location system 23.

During a location determination operation, the DSP 52 may receive a known data transmission front a mobile telephone 16, convolve the received data with a stored version of the known data to determine an incident edge of the signal or other desired portion thereof, and may associate a time value from the clock 54 with an edge or other desired portion. The DSP 52 may then transmit the associated time value from the clock 54 to the MSC 20 or the location system 23.

Referring again to FIG. 2, the MSC 20 conveys incoming telephone calls for a mobile telephone 16 from the PSTN 22 to the mobile telephone via a base station 18 and antenna 14 with which the mobile telephone 16 is registered. Similarly, the MSC 20 controls and routes telephone calls initiated from the mobile telephone 16 via the PSTN 22 to the intended destination telephone. In an advantageous embodiment, the mobile telephone 16 is a digital mobile telephone which operates according to the North American Time Division Multiple Access (TDMA) system IS-55 standard and the protocols described in the IS-54 and IS-136 standards. See, EIA/TIA Interim Standard IS-54-B "Cellular System Dual-Mode Mobile Station—Basestation Compatibility Standard", April, 1992; EIA/TIA Interim Standard IS-136 "Cellular System Dual-Mode Mobile Station—Basestation: Digital Control Channel Compatibility Standard", April, 1995.

As discussed in the background of the invention, it is often desirable to determine the specific geographic location of a mobile telephone 16 within the geographic area of the serving mobile telephone system 10. Upon initiation of a telephone call by the mobile telephone 16, the base station 18 receives and sends to the MSC 20 the telephone number of the mobile telephone (the A number) and the telephone number of the telephone being called by the mobile telephone (the B number). For each call handled by the MSC 20, the MSC 20 is configured to perform an A/B number analysis to determine whether a location function is to be performed. For example, the MSC 20 can initiate the location function each time a mobile telephone dials 911. In addition, the mobile telephone system provider can offer this location function as a service to its customers. In this situation, if the user of the mobile telephone 16 dials a certain number, the MSC 20 initiates the location function and the location of the mobile telephone is communicated to the mobile telephone user. Alternatively, the MSC 20 can determine whether a location function is required by referring to a user profile stored in the MSC 20 or the location system 23. For example, a company which uses a fleet of vehicles may want a location function performed each time a call is initiated from one of its mobile telephones. These examples illustrate that, by performing an A/B number analysis in combination with an optional user profile, the MSC 20 can initiate a location function based on various criteria. One of ordinary skill in the art will recognize that various other A/B number analyses may be performed to determine whether to initiate the location function.

If the MSC 20 determines that a location function is required, the location system 23 is used to determine a location of the mobile telephone 16. The location system 23 includes a location processor 24 which may be a single or distributed microprocessor, digital signal processor or both. The system 23 also includes a memory 26, which in turn includes location program instructions 28, a user profile database 29 and antenna location information 30. The antenna location information 30 includes the location of each antenna 14 within the geographic area served by the mobile telephone system 10. This information, typically expressed as degrees of longitude and latitude, is used to determine a location of a mobile telephone 16 based on its position relative to one or more of the antennas 14. The location program instructions 28 are executed by the location processor 24 to perform the steps of determining location according to the present invention. There are many ways to determine the location of the mobile telephone, including by time of arrival and angle of arrival, both of which are discussed below.

The location system 23 and its components may be part of the MSC 20 or separate from the MSC 20 and coupled to the MSC 20 over the PSTN 22, a local area or a wide area network. If the location system is part of the MSC 20, the location system components, such as the processor 24 and memory 26 may actually be MSC 20 components that are shared by the location system.

To facilitate use of the location information determined by the location system 23, the location information may be input into the GIS 32, either via the location system 23 or via the MSC 20. The GIS 32 may correlate the received location information, typically expressed in degrees of longitude and latitude, with a map. The map may then be printed, transmitted or graphically displayed to a public service provider 30. The public service provider 30 may be coupled to the PSTN 22 and may receive an emergency phone call from the mobile telephone 16. This arrangement permits a 911 call to be routed to a public service provider 30 at the same time that the location information is being determined and provided to the public service provider 30 via the location system 23 and/or the GIS 32.

Figure 3:
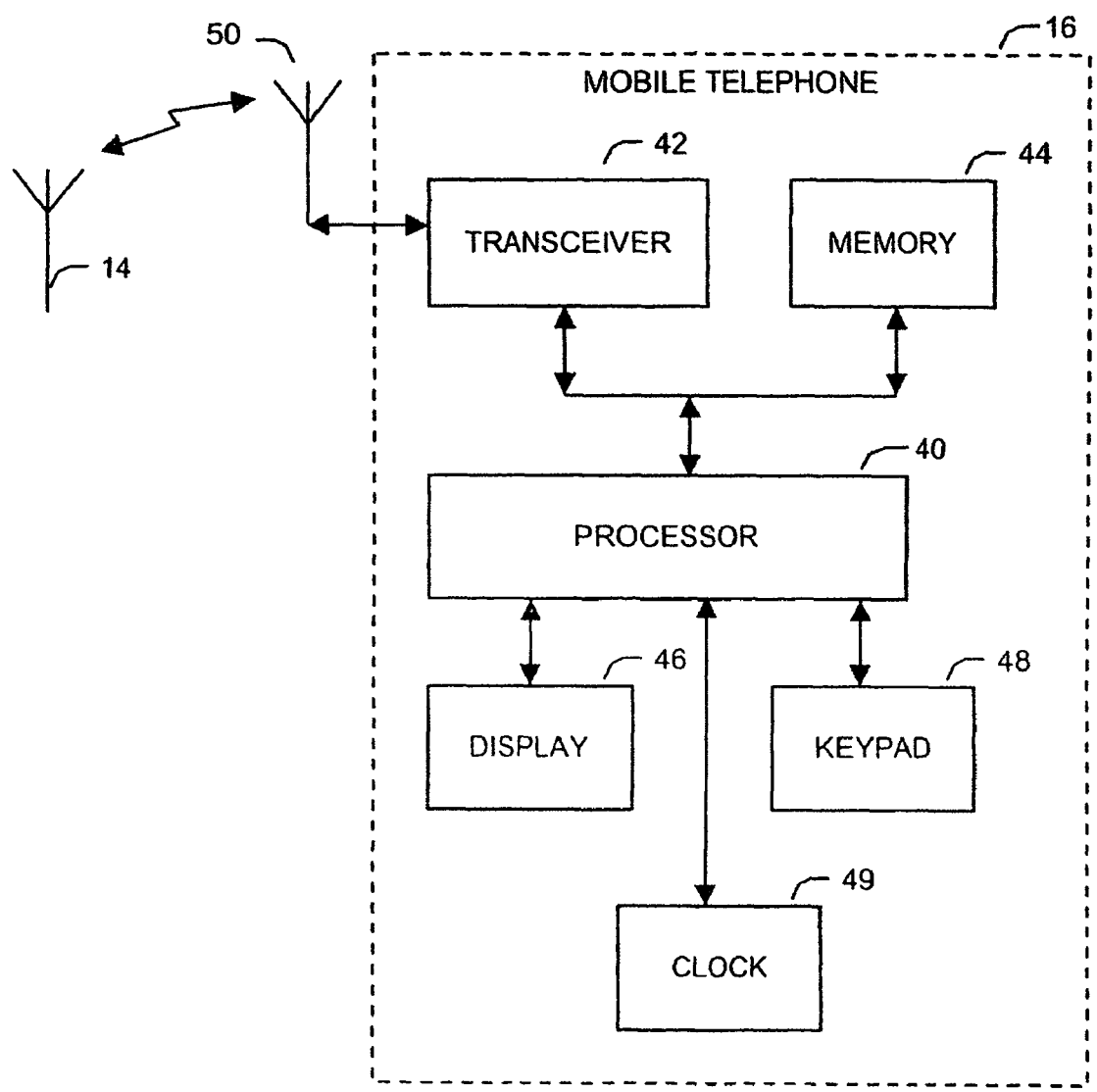
FIG. 3 depicts an internal view of a mobile telephone.

FIG. 3 depicts an internal view of a mobile telephone 16. The mobile telephone 16 includes a processor 40, coupled to a transceiver 42, a memory 44, a display 46, a keypad 48, a clock 49 and an antenna 50. The memory 44 includes, for example, the mobile identification number MIN of the mobile telephone 16 and the electronic serial number ESN of the mobile telephone. The memory 44 also may include program instructions for execution by the processor 40 to provide proper functionality to the mobile telephone 16. The keypad 48 may be used to dial and place calls and may or may not include a special key for providing the location function. The display 46 may be a CRT, LCD or touch screen display for indicating to a user menu options, a graphical configurable keypad, call status information, stored telephone number and other information. The transceiver 42 receives and transmits signals between the processor 40 and the antenna 50, which in turn exchanges signals with one or more base stations 18 over an air transmission medium.

The clock 49 of the mobile telephone 16 is synchronized with the clock 54 of one or more base stations 18 in a well known manner. This ensures that the mobile telephone 16 and base stations 18 can transmit during non-overlapping intervals of a common frequency channel. The synchronization between the mobile telephone 16 and a base station 18 also permits a propagation delay determination to be readily made at a receiving base station 18 for signals transmitted from the mobile telephone 16. The propagation delay determination may be made relative to synchronized edges of the clocks 49 and 54 and may facilitate calculation of a distance between the mobile telephone 16 and the receiving base station 18 during location determination.

Figure 4:
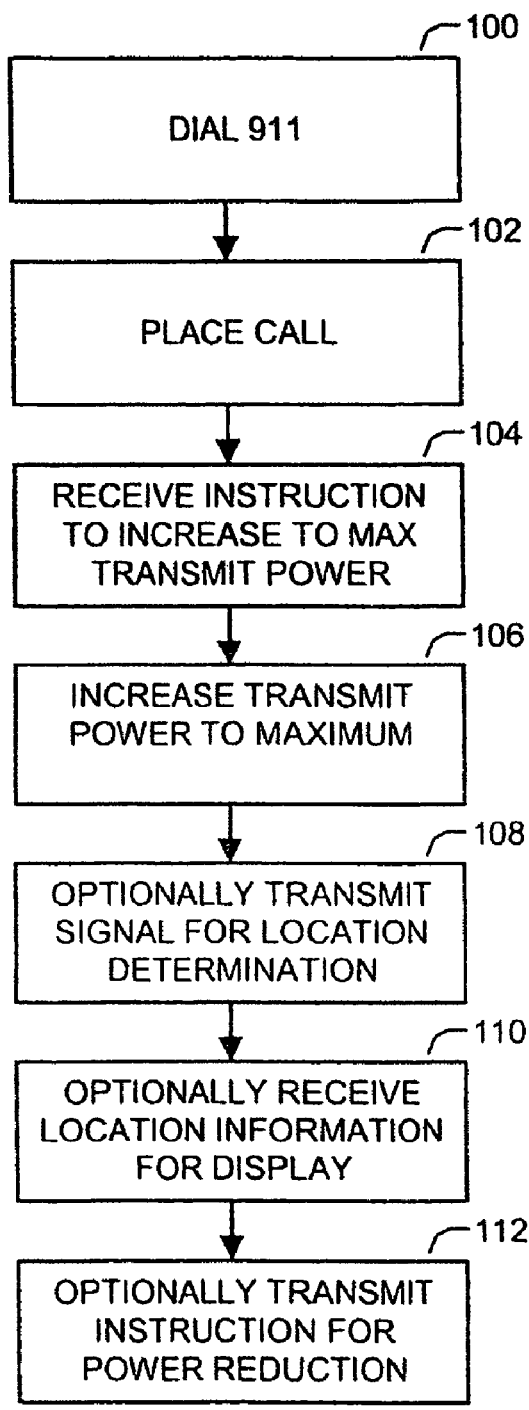
FIG. 4 depicts a method according to one embodiment of the present invention for causing a mobile telephone to transmit at an increased power level for location determination.

FIG. 4 depicts a method implemented by a mobile telephone, according to an embodiment of the present invention, for causing a mobile telephone to transmit at an increased power level for location determination. Referring to FIG. 4, in step 100, a user of the mobile telephone 16 dials 911. In response, in step 102, the processor 40 of the mobile telephone 16 places a telephone call to the mobile telephone system 10. The MSC 20 receives the call via one of the base stations 18 and, in response, determines that the location function is to be invoked. Subsequently, the MSC 20 initiates an instruction to increase the transmit power of the mobile telephone 16 to a higher level and preferably to a maximum power level so that the mobile telephone signal will be received at a plurality of antennas 14 of the mobile telephone system 10. The MSC 20 then transmits the increase power instruction to the mobile telephone 16 via a control channel of the serving base station 18.

In step 104, the mobile telephone 16 receives an instruction to increase the power level used for transmission of signals to the mobile telephone system 10. In step 106, the mobile telephone 16 increases the transmit power to a higher or maximum level. Then in step 108, the mobile telephone optionally transmits prespecified data as a signal used for location determination. The prespecified data may be designed, for example, to present an identifiable signal edge to a plurality of base stations 18 which, based on the time of arrival of the edge at each base station 18, provides information on the distance between the mobile telephone 16 and each of the base stations 18.

In step 110, the mobile telephone optionally receives and displays location information from the mobile telephone system regarding the location of the mobile telephone. This may be useful, for example, if the user of the mobile telephone desires to have his or her present location displayed to facilitate navigation from a present location. In step 112, the mobile telephone 16 optionally receives from the mobile telephone system 10 an instruction to reduce transmit power after, for example, successful location determination.

Figure 5:
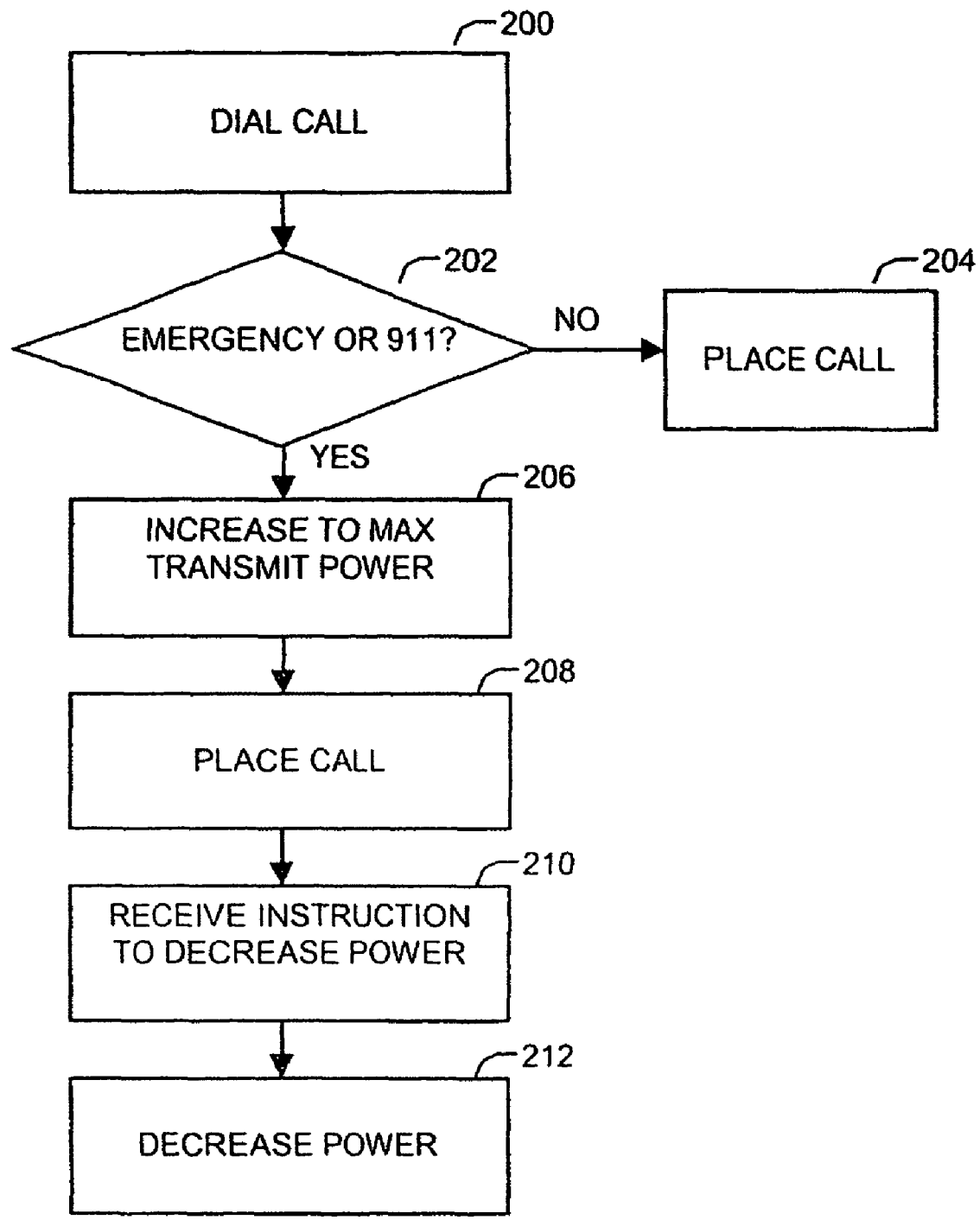
FIG. 5 depicts a method according to another embodiment of the present invention for causing a mobile telephone to transmit at an increased power level for location determination.

FIG. 5 depicts a method according to another embodiment of the present invention for causing a mobile telephone to transmit at an increased power level for location determination. Referring to FIG. 5, in step 200 a user of the mobile telephone 16 dials a telephone number or other code. In step 202, the processor 40 determines whether the dialed telephone number or code is one for which location information is needed, such as a 911 call. If not, the mobile telephone 16 places the call. If so, the mobile telephone increases transmission power, preferably to the maximum level in step 206. In step 208, the mobile telephone 16 places the call to the mobile telephone system 10. This may cause the mobile telephone network to connect the call to the appropriate destination via the PSTN, such as the public service provider 30 depending on the number dialed. The mobile telephone system further determines the location of the mobile telephone 16 in the manner described below.

In step 210, the mobile telephone optionally receives an instruction from the mobile telephone system to decrease its power level after location information corresponding to the location of the mobile telephone has been determined. In step 212, the mobile telephone 16 decreases its transmit power in response to receiving the instruction to decrease power.

Figure 6:
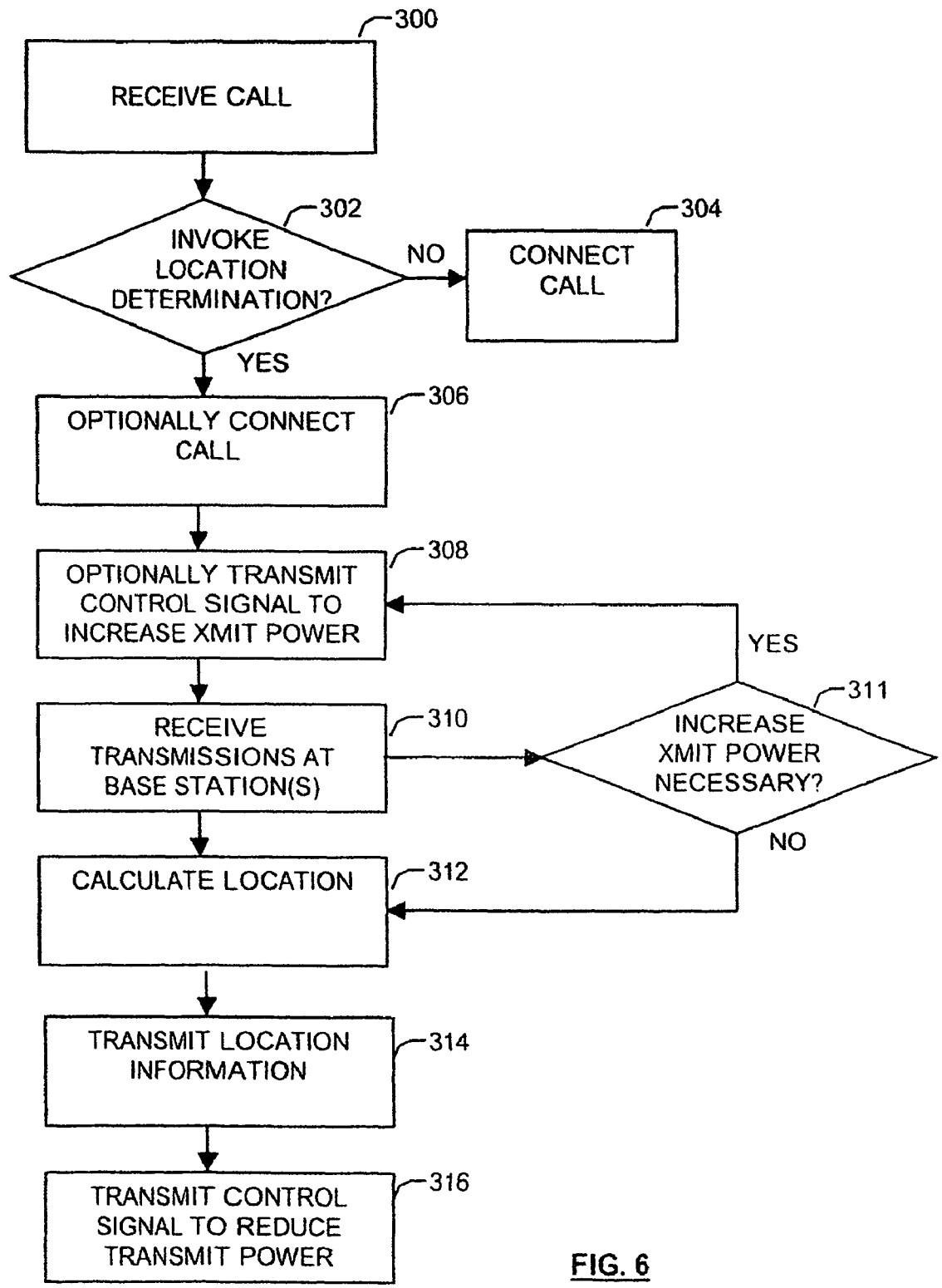
FIG. 6 depicts a method implemented in a mobile telephone system for causing a mobile telephone to transmit at an increased power level and to determine location.

FIG. 6 depicts a method according to another embodiment of the present invention for causing a mobile telephone system to locate a mobile telephone 16 and provide the location information to the appropriate party. Referring to FIG. 6, in step 300, the MSC 20 receives a call from a mobile telephone, including the MIN (telephone number) of the mobile telephone (A number) and the dialed number which is the B number.

In step 302, the MSC determines whether to invoke the location function based on the A or B number received. For example, if the dialed number is 911, a location function is initiated and step 306 begins. There may be other dialed numbers (B numbers) that automatically trigger the location function. Alternatively, a user or service profile stored in the user profile database 29 may be queried using the A and/or B number received from the mobile telephone. The result of the query may, for example, indicate: a) that a location function should be triggered automatically on receipt of predetermined A and/or B numbers; b) that a location function should be triggered automatically at each registration of the mobile telephone 16 with the mobile telephone system 10; c) that a location function should be triggered at specified intervals during operation of the mobile telephone 16 or any other convenient time; d) that location information should be transmitted to a particular destination, including a public service provider, the mobile telephone, a third party or a database.

If in step 302, the location processor determines that a location function is not invoked, then in step 304, the MSC 20 completes the call, generally via the PSTN 22 to the end telephone station specified by the dialed number. In step 306, the MSC 20 optionally connects the call to the dialed number. When the dialed number is 911, the call may be connected to a public service provider in order to talk with the caller about the emergency situation. Alternatively, when the dialed number is an ordinary telephone number but the subscriber profile indicates that the location function should be invoked, the call may be completed to the destination number in step 306 even as the location function is invoked.

Figure 8:
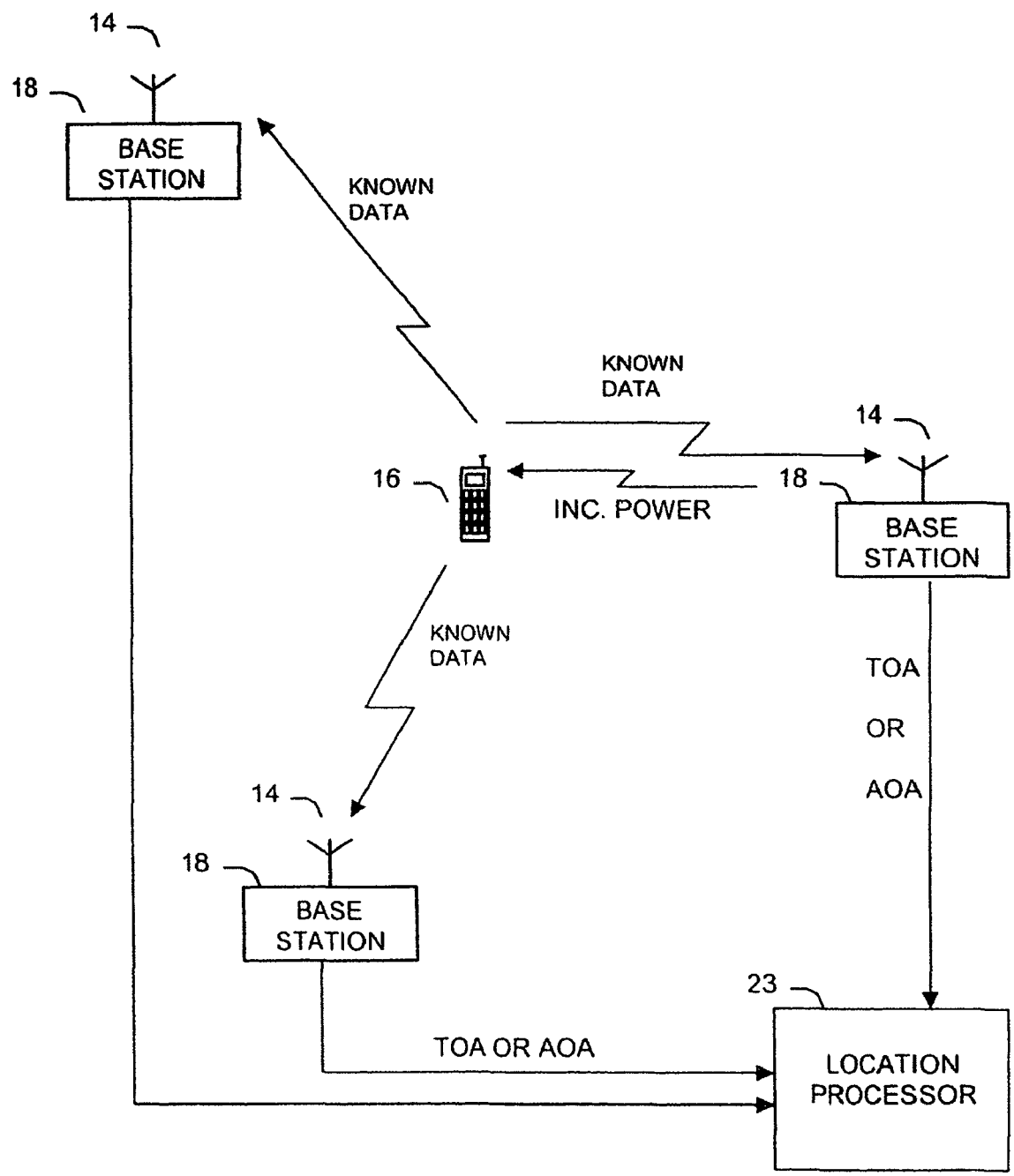
FIG. 8 depicts a functional view of a mobile telephone and mobile telephone system during a method of location determination according to an embodiment of the present invention.

In step 308, a component of the mobile telephone system 10, such as the MSC 20 or the location system 23, optionally causes control data to be transmitted to the mobile telephone 16 requesting the mobile telephone to transmit at either an increased or maximum power level. The control data is generally transmitted to the mobile telephone via the serving base station. This is illustrated in FIG. 8. Having the mobile telephone 16 transmit at an increased or maximum power level facilitates receiving transmissions from the mobile telephone 16 at a large number of base stations 18 and corresponding antennas 14. In general, the accuracy of location determination is improved as the number of receiving antennas 14 increases.

Steps 310-314 may be implemented in a variety of ways in accordance with the particular mobile telephone location scheme desired. In step 310, the mobile telephone system 10 receives transmissions from the mobile telephone 16, which may be transmitted at an increased power level. In one embodiment of the invention the mobile telephone 16 transmits a known pattern or data element at an increased or maximum power level to a plurality of base stations 18 as shown in FIG. 8. This known data is expected by the mobile telephone system 10 to be received from the mobile telephone 16 as part of the location function. The known data may be, for example, data used as part of mobile telephone registration, the MIN or ESN of the mobile telephone, or any other convenient data that is available at both the mobile telephone system 10 and the mobile telephone 16 itself.

Step 311 is an optional step which may be used to test the signal strength of the known data arriving at one or more base stations to determine whether it is necessary to transmit a control signal requesting the mobile telephone 16 to transmit at an increased power level. For example, if in step 311 the mobile telephone system 10 determines that an increase in transmit power is necessary, then step 308 begins again and an instruction may be transmitted to the mobile telephone to increase its transmit power level. Alternatively, if in step 311 the mobile telephone system 10 determines that it is not necessary for the mobile telephone 16 to increase or further increase its power level, then step 312 begins.

The mobile telephone system may determine whether or not the present transmission power level is appropriate based on the signal to noise ratio of the known data as received at one or more base stations 18. If the signal to noise ratio is low, the mobile telephone system 10 may transmit a control signal in step 308 to the mobile telephone 16 requesting it to increase its transmit power level. This facilitates optimizing the transmission power level of the mobile telephone 16 according to the situation and may help to avoid interference from a mobile telephone transmitting at maximum power where not necessary. It may also help to preserve battery power at the mobile telephone 16.

In step 312 the mobile telephone system 10 calculates the location of the mobile telephone based on the known data received at the base stations 18. The location may be calculated using a time of arrival method, for example, by: a) determining the earliest time of arrival of the signal at each base station, typically by convolving the signal representing the known data with a stored replica to identify correlation peaks. This may be done by the DSP 52 at each base station 18; b) associating a reading of the GPS receiver/clock 54 of the receiving base station with the earliest time of arrival or correlation peak determined at that base station; c) transmitting the time of arrival for the mobile telephone from each receiving base station to the location system 23 as shown in FIG. 8; c) estimating a relative distance between the mobile telephone 16 and each of the receiving antennas 14 based on differences in times of arrival; d) determining actual distances between based on the differences in times of arrival and known signal propagation delay; and e) calculating the location of the mobile telephone in, for example, degrees of longitude and latitude by triangulation based on the determined distances from the base stations and the known locations of each of the base stations stored in the antenna location information database 30. Steps a) through e) are well known.

As an alternative to determination of the location of the mobile telephone 16 based on time of arrival, the mobile telephone system may implement an angle of arrival determination scheme. In this scheme, the antennas 14 at each base station 18 are typically multi-element and/or multi-beam antennas. Multi-element antennas have multiple elements which each receive incident signals. Based on phase differences in an incoming signal as received at a plurality of antenna elements, an estimate of the direction of the signal or angle of arrival may be made. The phase difference calculation may be made by the DSP 52 of the base station 18. When an antenna is a multi-beam antenna, each beam has a directionality associated with it. The direction or angle of arrival of an incident signal may therefore be determined based on the power level(s) of the received signal at one or more of the beams. Furthermore, when a plurality of base stations 18 receive the known data from the mobile telephone 16, the location of the mobile telephone may be determined based on the geometric relationships between the estimated angle of arrival at each of a plurality of base stations 18.

Alternatively, the location of a mobile telephone 16 may be determined based on signals received at one or more base stations based on both angle of arrival and time of arrival. For example, considering a case where an incoming signal is received at a single base station 18, the base station may calculate the angle of arrival as described above. This calculation will determine a vector, beginning at the base station 18, on or close to which the mobile telephone 16 is located. The location on the vector may be determined by determining the distance of the mobile telephone 16 from the base station. This calculation may be made in a TDMA system based on the time of arrival of a signal from the mobile telephone at the base station. For example in TDMA systems the clocks of mobile telephones and each base station are synchronized. This permits mobile telephones to transmit signals to base stations during non-overlapping time periods on the same frequency channels. This also permits determination of a propagation delay of a signal communicated between the mobile telephone 16 and the base station 18. For example, a signal from a mobile telephone 16 may be transmitted with a leading edge of the signal having a known relationship to the synchronized clocks at the mobile telephone and receiving base station 18. When the base station receives the signal from the mobile telephone, the base station may determine the delay of the leading edge of the signal relative to the clock edge that caused the mobile telephone to begin transmitting. Because the clocks of the mobile telephone 16 and the base station 18 are synchronized, the measured delay at the base station is proportional to and may represent the propagation delay between the mobile telephone 16 and the base station 18. Based on the propagation delay and data specifying the propagation speed of signals, the distance between the mobile telephone 16 and the base station 18 may be calculated. The distance may be used in conjunction with the angle of arrival to determine the location of the mobile telephone 16.

In step 314, the location information is transmitted to a desired destination, which may be one or several of a variety of places based on the application. The destination may be specified in the service or user profile database 29 and available upon querying based on the A or B number from the mobile telephone 16. In one embodiment, the location information may be transmitted over a network to a GIS in response to a 911 emergency telephone call. The GIS may correlate degrees of longitude and latitude embodied in location information to an indication of a location on a street map of a geographical area. The street map may then be communicated to a public service provider with the location of the mobile telephone on the street map highlighted based on the location information. This may assist the police or other public service provider in finding the user of the mobile telephone in a rescue operation. The location information may also be transmitted to a database for storage and tracking, to the mobile telephone 16 itself or to, for example, a third party such as a fleet vehicle command and control center.

In step 316, the mobile telephone network initiates and transmits a control signal to the mobile telephone to reduce its transmission power to a normal level. This preserves battery power in the mobile telephone, which may be particularly useful in an emergency situation.

Although specific embodiments of the invention have been disclosed, one of ordinary skill in the art will realize that changes may be made to those embodiments without departing from the spirit and scope of the invention.

The invention claimed is:

1. A method of selecting a transmitter power for a mobile telephone, comprising:
   receiving a telephone number; and a mobile telephone system transmitting a control message, in response to the received telephone number meeting a predetermined criterion, wherein the control message is associated with selection of a transmitter power for the mobile telephone.

2. The method of claim 1, wherein the received telephone number is a dialed number from the mobile telephone.

3. The method of claim 1, wherein the received telephone number is a MIN.

4. The method of claim 1, wherein the received telephone number is a called number.

5. The method of claim 1, wherein the transmitter control message is associated with an increased transmitter power.

6. The method of claim 1, wherein the transmitter control message is associated with a decreased transmitter power.

7. The method of claim 1, wherein the predetermined criterion is that the received telephone number is an emergency services number.

8. The method of claim 1, wherein the predetermined criterion is that the received telephone number is 911.

9. The method of claim 1, wherein the predetermined criterion is that the received telephone number is a navigation assistance number.

10. A method of selecting a transmitter power for a mobile telephone operating in a mobile phone system, comprising:
receiving a telephone number;
the mobile phone system selecting a transmitter power for the mobile telephone based on the received telephone number; and
transmitting a control message, in response to the telephone number meeting a predetermined criterion, wherein the control message is associated with selection of a transmitter power for the mobile telephone.

11. A method of selecting a transmitter power for a mobile telephone operating in a mobile phone system, comprising:
receiving a telephone number;
the mobile phone system selecting a transmitter power for the mobile telephone based on the received telephone number, wherein the received telephone number is a mobile identification number (MIN) from the mobile telephone, and the transmitter power is selected by querying a user profile database with the MIN to determine whether to invoke a transmitter control function.

12. The method of claim 11, further comprising invoking the transmitter control function based on the query.

13. The method of claim 10, wherein the received telephone number is a dialed number from the mobile telephone.

14. The method of claim 10, wherein the received telephone number is a mobile identification number.

15. The method of claim 10, wherein the received telephone number is a called number.

16. The method of claim 10, wherein the transmitter control message is associated with an increased transmitter power.

17. The method of claim 10, wherein the transmitter control message is associated with a decreased transmitter power.

18. The method of claim 10, wherein the predetermined criterion is that the received telephone number is an emergency services number.

19. The method of claim 10, wherein the predetermined criterion is that the received telephone number is 911.

20. The method of claim 10, wherein the predetermined criterion is that the received telephone number is a navigation assistance number.

* * * * *